United States Patent [19]

Umeda et al.

[11] Patent Number: 4,784,692

[45] Date of Patent: Nov. 15, 1988

[54] COLOR-DEVELOPING AGENT FOR PRESSURE-SENSITIVE RECORDING SHEET AND COLOR-DEVELOPING SHEET THEREOF

[75] Inventors: Hiroaki Umeda; Mamoru Suzuki; Akira Hasegawa; Kunio Hata, all of Tokyo, Japan

[73] Assignee: Jujo Paper Co., Ltd., Tokyo, Japan

[21] Appl. No.: 122,078

[22] Filed: Nov. 18, 1987

[30] Foreign Application Priority Data

Dec. 10, 1986 [JP] Japan ................................ 61-294509

[51] Int. Cl.⁴ ................................................ C09D 11/00

[52] U.S. Cl. ....................................... 106/21; 503/216; 503/210; 503/212; 503/225; 585/899; 427/150

[58] Field of Search .................. 106/21; 503/216, 210, 503/211, 212, 225; 585/899; 427/150

[56] References Cited

U.S. PATENT DOCUMENTS 4,749,680 6/1988 Umeda et al. ........................ 427/150

*Primary Examiner*—Amelia Burgess Yarbrough
*Attorney, Agent, or Firm*—Koda and Androlia

[57] ABSTRACT

The color-developing agent for pressure-sensitive recording sheet comprises a reaction product of carboxylated terpenephenol resin, aromatic carboxylic acid and polyvalent metal compound. The color-developing sheet containing the above color-developing agent provides an excellent color-developing rate and an improved light fastness.

6 Claims, No Drawings

COLOR-DEVELOPING AGENT FOR PRESSURE-SENSITIVE RECORDING SHEET AND COLOR-DEVELOPING SHEET THEREOF

BACKGROUND OF THE INVENTION

1. Field of the Invention

This invention relates to a color-developing agent for pressure-sensitive recording. More specifically, this invention relates to a color-developing agent which is superior in color-developing ability and light fastness.

2. Prior Art

Hitherto, many kinds of electron-accepting color-developing agents are well-known. The typical color-developing agents include inorganic solid acids such as acid clay, activated clay, attapulgite (described in U.S. Pat. No. 2,712,507); substituted phenols and diphenols (described in the Japanese Patent Publication No. 9309/1985); p-substituted phenol formaldehyde polymers (described in the Japanese Patent Publication No. 20144/1967); aromatic carboxylic acid metal salts (described in the Japanese Patent Publication Nos. 10856/1974 and 1327/1977); 2,2'-bisphenol sulfone compounds (described in the Japanese Patent Laid-Open No. 106313/1979); and so on.

These well-known color-developing agent has both advantages and disadvantages. For example, inorganic solid acids are as advantages inexpensive and excellent in color-developing speed, but they have disadvantages that a color-developing ability deteriorates in a storage owing to the absorption of gases and moisture in the air, and the developed images discolor or fade prominently upon exposure to sunlight, fluorescent light, etc. The substituted phenols provide insufficient color-developing ability and inferior image density.

P-substituted phenol-formaldhyde polymers (p-phenyl-phenolnovolak resin etc.) have superior color-developing ability, but have the disadvantage that the coating sheet undergoes yellow upon exposure to sun light or gases in the air in the storage. In the Japanese Patent Application No. 159540/1985 (the Japanese Patent Laid-Open No. 19486/1987), inventors have proposed a color-developing sheet comprising a polyvalent metal salt of carboxylated terpenphenol resin as a novel color-developing agent, in order to avoid both the yellowing in storage by light and gases and the discoloration and fading of the developed image by chemicals such as plasticizer.

SUMMARY OF THE INVENTION

However, both the color-developing agent and the color-developing sheet in which the novel polyvalent metal salt of carboxylated terpene-phenol resin is used, are required to be improved in color-developing properties, particularly color-developing rate and light fastness.

It is an object of this invention to provide a color-developing agent and a color-developing sheet applied therewith which are improved in color-developing properties, particularly color-developing rate, and light fastness, under maintaining both a stability to light, gases etc. and a stability to chemicals. The above object can be performed by using as a color-developing agent a reaction product of carboxylated terpenphenol resin, aromatic carboxylic acid and polyvalent metal compound. This invention will now be described in detail with reference to the following Examples that by no means limit the scope of this invention.

Generally, as described in the Japanese Patent Application No. 159540/1985, the carboxylated terpenphenol resin is prepared by the following process.

The addition reaction of cyclic monoterpene and phenol is carried out in petroleum-solvent in the presence of an acidic catalyst, e.g. aluminum chloride, boron trifluoride, sulfuric acid, polyphosphoric acid, to prepare a condensation product. Cyclic monoterpen used in this invention includes, for example, pinene, limonene, terpinolene, methadiene, gum-terpentine oil which contains α-pinene as main ingredient, dipentene which contains α-limonene as main ingredient, and the like. Phenol used in this invention includes monophenols, for example, carbolic acid, alkyl-substituted phenols, alkoxy-substituted phenols, halogenated phenols, etc.; and polypalent phenols, for example, resorcin, catechol, etc. Petroleum solvent used in this invention includes, for example, benzene, toluen, xylene, n-hexan, n-heptane, halogenized solvent such as dichloromethane, chloroform, trichloroethane, brombenzene, etc. The condensation product is made basic with alkaline metal, alkaline metal hydroxide, or alkaline metal carbonate. The basic condensation product is allowed to react with carbonic acid gas under high temperature (140°-180° C.) and high pressure (5-30 atm.) in an autoclave to introduce carboxy groups (Kolbe-Schemitt's reaction). After the completion of reaction, the solvent is removed by a distillation. Meanwhile, the product is cooled to room temperature and washed to separate out the unreactants. The resultant product is extracted with an aqueous alkaline solution. After the neutralization of extracted product, carboxylated terpenphenol resin is separated out. After filtrating and washing, a purified carboxylated terpenphenol resin is obtained.

Aromatic carboxylic acid, in which carboxl group is bonded to an aromatic ring (mono-ring or polyrings), includes, for example, benzoic acid, p-hydroxybenzoic acid, chlorobenzoic acid, bromobenzoic acid, nitrobenzoic acid, methoxybenzoic acid, ethoxybenzoic acid, toluic acid, ethylbenzoic acid, p-n-propylbenzoic acid, p-isopropylbenzoic acid, 3-methyl-4-hydroxybenzoic acid, 3-ethyl-4-hydroxybenzoic acid, 3-methoxy-4-hydroxybenzoic acid, p-tert.-butylbenzoic acid, o-benzoylbenzoic acid, p-cyclohexylbenzoic acid, salicylic acid, 3-methyl-5-tert.-butylsalicylic acid, 3,5-ditert.-butylsalicylic acid, 5-nonylsalicylic acid, 5-cyclohexylsalicylic acid, 3-cyclohexylsalicylic acid, 3,5-diamylsalicylic acid, cresotic acid, 5-nonylsalicylic acid, 5-cumylsalicylic acid, 3-phenylsalicylic acid, 3,5-sec.-butylsalicylic acid, 2,4-dihydroxybenzoic acid, 2,5-dihydroxybenzoic acid, gallic acid, naphthoic acid, phthalic acid monobenzylester, phthalic acid monocyclohexyl ester, salicylosalicylic acid, 3-tert.-butyl-5-α-methylbenzylsalicylic acid, 3,5-di(α-methylbenzyl)salicylic acid, phthalic acid, terephthalic acid, isophthalic acid, diphenic acid, naphthalene dicaroxylic acid, naphtholic acid, and the like.

Among these carboxylic acids, mono-carboxylic acids are most preferable. Although the ratio of carboxylated terpenphenol resin to aromatic carboxylic acid is not limited, it is desirable to use at most one molar equivalent, particularly 5-50% molar equivalent, of aromatic carboxylic acid, based on carboxylated terpenphenol resin. If the aromatic carboxylic acid is less than 5% molar equivalent, the improvement of the color-developing rate is small. If the aromatic carboxylic acid is more than 50% molar equivalent, the dispersibility in water is decreased in process for preparing a coating liquid of the color-developing agent.

Polyvalent metal compound used in this invention includes, for example, oxides, halides, carbonates, sulfates, nitrates, acetates, formates, oxalates, benzoates, acetylacetonate, salicylates, etc. of magnesium, aluminum, cadmium, calcium, titanium, zinc, nickel, cobalt, manganese, vanadium and the like.

Magnesium compounds, aluminum compounds and zinc compounds are preferable; and zinc compounds are most preferable.

The reaction product of carboxylated terpenphenol resin, aromatic carboxylic acid and polyvalent metal compound (this product is named as a combined polyvalent metal salt) is prepared either by mixing the carboxylated terpenphenol resin, the aromatic carboxylic acid and polyvalent metal compound uniformly and then causing reaction thereof, or by mixing above two ingredients uniformly, adding the third ingredient to the mixture and causing a reaction thereof. Uniform mixing is performed by dissolving the ingredients in a solvent under stirring or by melting them under heating, and the like. Examples for the solvent include aqueous basic solutions such as sodium hydroxid, potassium hydroxide, sodium carbonate, etc.; organic solvents such as alcohol, aceton, etc.; and the mixture thereof.

The combined polyvalent metal salt of this invention is prepared in solvent as follows. The required amounts of carboxylated terpenphenol resin and aromatic carboxylic acid are added to methanollic solution containing sodium hydroxide and are further stirred to form an uniform solution. The uniform solution is heated to about 50° C. to prepare a heated solution. Then, an aqueous or methanollic solution of polyvalent metal compound, e.g. that of zinc chloride, is added dropwise with stirring to the heated solution to complete the reaction.

The solvent is removed under vacuum. After optionally washing, neutralizing, extracting and the like, the intended combined polyvalent metal salt is obtained.

The preparation of an combined polyvalent metal salt by heat-melting process is performed as follows. The required amounts of a carboxylated terphenephenol resin and an aromatic carboxylic acid are heated to 100°-200° C. under stirring in a glass vessel to obtain an uniformly melted product. To the melted product there is gradually added an ammonium salt such as ammonium carbonate, etc., and a polyvalent metal compound such as zinc oxide, aluminum chloride etc., to cause a reaction. After the completion of the reaction, the product is cooled to room temperature. In this manner, an intended combined polyvalent metal salt is obtained. The obtained combined polyvalent metal salt is a novel color-developing agent which provides a superior color-developing rate and an improved light fastness of the colored image under maintaining the advantages of polyvalent metal salt of carboxylated terpenephenol resin, i.e. the stability against light, gases in atmosphere and plasticized stability of colored image.

The combined polyvalent metal salt of this invention provides a very excellent ability as a pressure-sensitive color-developing agent in the use alone. However, the salt of this invention can be used alone or in combination with the known color-developing agent, for example, inorganic solid acid such as activated clay, phenol-formaldehyde novolak resin, substituted phenol resin, and metal salt thereof, aromatic carboxylic acid metal salt, and the like. The combined polyvalent metal salt of this invention is applied to a wide range of field concerning pressure-sensitive recording sheets, for example, a middle sheet of pressure-sensitive recording sheets, a bottom sheet thereof, a single-type pressure-sensitive recording sheet by coating as laminated layer or as a mixed-state layer; a detecting agent of leuco dye stuff by dissolving this salt in organic solvent; a spot printing ink by mixing this salt with wax, etc.; a pressure-sensitive color-developing ink by encapsulating of color-developing and/or leuco dye stuff; and the like.

The color-developing sheet which contains the color-developing agent of this invention is preferred by the conventionally known method, for example:

(a) applying on a support such as paper, an aqueous coating color in which an aqueous suspension of a color-developing agent is used;

(b) adding the color-developing agent to the stuff in a paper making; and (c) coating on the surface of the support the organic solvent in which a color-developing agent is dissolved or suspended, and then drying the coated support.

The coating color is produced by mixing fillers (such as kaolin-clays, calcium carbonate), binders (such as starch, polyvinyl alcohol and synthetic or natural latex), etc. and then giving appropriate viscosity and coating suitability for the mixed materials. It is desirable to use 10 to 70% by weight of the color-developing agent, based on the total solid content in the coating color. If the color-developing agent is less than 10% by weight, the sufficient results cannot be attained. If the color-developing agent is more than 70%, the surface properties of the color-developing sheet are inferior.

The coating weight is more than 0.5 g/m$^2$, preferably 1.0–10 g/m$^2$. The color-developing agent of this invention can be used for the conventionally known pressure-sensitive color-forming dye. Examples of these dyes are as follows.

Triphenylmethane leuco dyes

Crystal violet lactone, malachite green lactone, 3-dimethylamino-triphenylmethanephthalide, and the like.

Fluoran leuco dyes 3,6-dimethoxyfluoran, 3-N-cyclohexylamino-6-chlorofluoran, 3-diethylamino-6-methyl-7-chlorofluoran, 1,2-benzo-6-dimethylaminofluoran, 1,2-benzo-(2',-diethylamino)-6-diethylaminofluoran, 3-diethylamino-7-dibenzylaminofluoran, 3-diethylamino-6-methyl-7-dibenzylaminofluoran, 3-diethylamino-5-methyl-7-dibenzylaminofluoran, 3-diethylamino 7-aminofluorane, 3-diethylamino-6 methyl-7 anilinofluoran, 3-diethylamino-7-(o-acetyl)anilinofluoran, 3-diethylamino-7-piperidinofluoran, 3-diethylamino-7-pyrolidinofluoran, and the like.

Spiropyran leuco dyes spiro-[3-methylchromene-2,2'-7'-diethylamino chromene], spiro[3-methylchormene-2,2'-7'-dibenzylamino-chromene], 6',8'-dichloro-1-3,3-trimethylindolino-benzospiropyran, 1,3,3-trimethyl-6'-nitrospiro(indoline)-2,2'-2'H chromene, spiro[1,3,3-trimethylindoline-2,3'-8'-bromonaphtho-[2,1-b]pyran], spiro[3-methyl-benzo(5,6-a)chromene-2,2'-7'-diethylaminochromene and the like.

Phenothiazine leuco dyes 3-diethylamino-7(N-methylanilino)-10-benzoyl-phenoxazine; 3,7-bis(dimethylamino)-10-benzoylphenothiazine, 10-(3',4',5'-trimethoxy-benzoyl)-3,7-bis-(dimethylamino)-phenothiazine, and the like.

Phthalide leuco dyes 3-4(diethylamino-2-ethoxyphenyl)-3-(1-ethyl-2-methylindol-3-yl)7-azaphthalide, and the like.

Indol leuco dyes 3,3 bis(1-octyl-2-methylindol-3-yl)phthalide, and the like.

Triphenylmethane leuco dyes

N-butyl-3[bis- 4-N-methylanilino)phenyl methyl] carbazole and the like.

Function

It is unclear why the novel combined polyvalent metal salt of carboxylated terpenephenol resin of this invention has both a superior color-developing ability and an improved light fastness of image. However, the reason is assumed as follows. Carboxylated terpene-phenol resin has a structure of monobasic or dibasic acid in the produced state. And the perfect production of the polyvalent metal salt from the carboxyl group in the reaction between a carboxylated terpenephenol resin and a polyvalent metal is difficult and one portion of carboxyl groups is freely present.

Hence, its stability in capsule oil is somewhat decreased, so that the color-developing rate become slow and the light fastness of the colored image is somewhat inferior owing to formation of an unstable compound with leuco dyestuff.

On the other hand, the reaction of the mixture of a carboxylated terpenephenol resin and an aromatic carboxylic acid with a polyvalent metal compound provides a combined polyvalent metal salt under a strong bonding of various carboxyl groups in different carboxylic acids, and further the reaction of carboxyl groups as resin end groups is carried out to provide a polyvalent metal salt easily. Also, free carboxyl groups are prominently decreased and the above defects can be improved.

EXAMPLES

The following examples are given merely as illustrative of this invention and are not to be considered as limiting. All percentages and parts throughout the application are by weight unless otherwise indicated.

EXAMPLE 1

Synthesis of carboxylated terpenephenol resin 980 g (10 mole) of carbolic acid are dissolved in 200 ml of toluene. 56.8 g of ethyl ether complex of boron trifluoride are added thereto. 1360 g (10 mol) of α-pinene (manufactured by Arakawa Kagaku Co., Ltd.) are added dropwise thereto for about 2 hours while keeping the temperature at below 20° C. After the completion of the dropping, the temperature is raised to 35°-40° C. and the reaction is carried out for 8 hours. After the completion of the reaction, the organic layer was separated out by decantation. Water was added to the residual layer to decompose the catalyst. The reaction product was extracted with isopropyl ether. The aforesaid organic layer was admixed with the extract, and the admixture was washed with water and dried over anhydrous sodium sulfate. The solvent and unreactants were separated out by distillation at 180° to 200° C. under reduced pressure. The unreactive carbolic acid and turpentine oil were removed by steam distillation to obtain 1400 g of terpene-phenol resin.

1400 g of the terpene-phenol resin were dissolved in 200 ml xylene to obtain a resin solution. The resin solution and 7.7 g of metallic sodium were charged in an autoclave. Under stirring, carbon dioxide gas was charged until pressure in the autoclave reached 40 kg/cm$^2$. The reaction was furthers carried out for 2 hours. After cooling, the organic layer was removed and the water-layer was neutralized with hydrochloric acid. The reaction product was extracted with isopropyl ether, washed out with water, dried over anhydrous sodium sulfate. After removing the solvent, 1300 g of solid carboxylated terpenephenol resin were obtained (acid value: 230).

In this case, the acid value was determined in accordance with JIS K-0070, under using the obtained carboxylated terpenephenol resin dissolved in the mixed solvent of toluene and ethanol.

Synthese of combined polyvalent metal salt 100 parts of the above carboxylated terpenephenol resin, 20 parts of benzoic acid and 15 parts of pulverized sodium hydroxide were charged into a glass vessel, and 500 ml of methanol were added thereto to dissolve the product. The dissolved product was heated to 50°-55° C., and 100 ml of methanol which contains 7.5 parts of zinc chloride were added dropwise thereto. The reaction was carried out with stirring at 50° C. for one hour, then the solvent was removed under reduced pressure. In this manner, a light-yellow foamy solid was obtained. After drying and pulverizing, a combined metal salt (melting point: 145°-150° C.) was obtained (this is named as Compound No. 1).

Preparation of a color-developing sheet

Using the above Compound No. 1, a suspension of the following formulation was prepared by means of a sand grinding mill.

| | |
|---|---|
| Color-developing agent No. 1 | 24.5 parts |
| Sodium polyacrylate | 2.5 parts |
| Water | 43.0 parts |

A coating composition of the following formulation was prepared by using the above suspension.

| | |
|---|---|
| Suspension | 40 parts |
| Calcium carbonate | 100 parts |
| Styrene-butadiene latex (40%) | 15 parts |
| Oxidized starch | 15 parts |

The coating composition was coated on a fine paper and dried so that the amount of the coating composition applied was 6.0 g/m$^2$(solid). Thus, a color-developing sheet was obtained.

Preparation of a transfer sheet

The transfer sheet coated with pressure-sensitive dye-containing microcapsules was prepared by the following procedure.

90 parts of a 10% aqueous solution of an ethylene-maleic anhydride copolymer (trade mark: EMA-31, made by Monsanto Co.) and 90 parts of dilution water were mixed, and 10 parts of urea and 1 part of resorcinol were dissolved in the mixed solution. The obtained solution was adjusted to a pH-value of 3.4.

Separately, an oil mixture consisting of alkyldiphenylethane (trade mark: Hysol SAS 296, made by Nisseki Chemical Co.) and diisopropylnaphthalene (trade mark: KMC-113, made by Kureha Chemical Co.) in a proportion of 1:1 was prepared.

As two core materials, (a) the oil of blue color-forming dye was prepared by dissolving 3% of crystal violet lactone (CVL) and 1% of benzoyl leuco methylene blue in the above oil mixture, and (b) the oil of black color-forming dye was prepared by dissolving 5% of 3-diethylamino-6-methyl-7-anilinofluoran, 1% of 3-diethylamino-6-methyl-7-diphenylmethylaminofluoran and 0.5% of 3-diethylamino-6-methyl-7-chlorofluoran in the above oil mixture.

180 parts of each of above dye oils were added to the above-produced aqueous solution of a pH-value having 3.4, and emulsified until an average particle size of 4.0 was obtained.

To this emulsion were added 27 parts of 37% formalin and heated to 55° C. After carrying out at encapsulation reaction at 55° C. for 2 hours, the reacted solution was adjusted to a pH-value of 7.5 by the addition of 28% aqueous ammonia solution to prepare two capsule slurries which contains pressure-sensitive dyes.

180 parts of each of the capsule slurries, 40 parts of wheat starch and 85 parts of 8% oxidized starch solution were mixed to prepare two kinds of coating solution.

These coating solution were independently coated on a fine paper having a basis weight of 45 $g/m^2$ to obtain (a) blue color-forming transfer sheet and (b) black color-forming transfer sheet.

Evaluation of the color-developing sheet

Each of the transfer sheets (a) and (b) and a color-developing sheet are laid so that the coated surfaces of the sheets are faced with each other.

The obtained colored sheets were tested with regard to color-developing rate, end color-developing intensity and light fastness. The test results are summarized in Table 1.

(1) Color-developing rate and color-developing intensity

A CB-sheet coated with microcapsules and a color-developing sheet coated with a color-developing agent are laid so that the two coated surfaces are faced with each other. A pressure is applied to the two sheet by dot-plate roll calender to form a color. The reflectance $I_0$ of the sheet before color development, the reflectance $I_1$ of the sheet of 10 sec after color development, are measured by a Hunter Reflectmeter (manufactured by Toyo Seiki Co.; D type) using an amber filter. The color-developing rate ($J_1$) is expressed by the following equation:

$$\text{Color-developing rate } J_1 = \frac{I_0 - I_1}{I_0} \times 100\ (\%)$$

And color-developing intensity is expressed by the following equation, using the reflectance $I_2$ of the sheet of 24 hours after color development.

$$\text{Color-developing intensity } J_2 = \frac{I_0 - I_2}{I_0} \times 100\ (\%)$$

Higher values of $J_1$ and $J_2$ are preferred.

(2) Light fastness

The colored surface of 24 hours after color development by following the method (1) is exposed to a Fade-O-Meter for 6 hours. The reflectance is measured in the same method as in (1). From the reflectance $I_3$ after the exposure, the color-developing intensity $J_3$ is calculated by the following equation:

$$J_3 = \frac{I_0 - I_3}{I_0} \times 100\ (\%)$$

From the color-developing intensity $J_2$ and $J_3$ before and after the exposure, the light fastness is expressed by the following equation:

$$\text{Light fastness } H_1 = \frac{J_3}{J_2} \times 100\ (\%)$$

Higher light fastness is preferred.

EXAMPLE 2

A carboxylated terpenephenol resin having an acid value of 253 was obtained by following the procedure in Example 1, using limonene and carbolic acid. 140 parts of the carboxylated terpenephenol resin and 15 parts of salicylic acid were admixed, and then 50% methanol solution which contains 20 parts of sodium hydroxide was added thereto to dissolve the product. The dissolved product was kept at 50° C. for one hour, and 50% aqueous zinc sulfate solution was added dropwise thereto for one hour. The reaction was carried out at 50°-55° C. for one hour. After concentrating methanol under reduced pressure, a milky white solid was obtained. Water was added to this solid at room temperature. After filtration and drying, white crystalls were produced (this is named as Compound No. 2).

A suspension and a color-developing sheet were obtained in the same manner as in Example 1.

The color-developing sheet was tested by the above method, and the results were shown in Table 1.

EXAMPLE 3

A carboxylated terpenephenol resin having an acid value of 207 was obtained by following the procedure in Example 1, using gum-turpentine oil and ocresol. 100 parts of the obtained carboxylated terpenephenol resin, 45 parts of 3,5-ditert.butylsalicylic acid and 25 parts of sodium hydroxide were dissolved in 1000 ml methanol. Compound No. 3 was prepared in the same manner as in Example 1, and a color-developing sheet was produced in the same manner as in Example 1 and tested for its quality and performance. The test results were shown in Table 1.

EXAMPLE 4

A carboxylated terpenephenol resin having an acid value of 234 was obtained by following the procedure in Example 1, using gum-turpentine oil and carbolic acid.

Compound No. 4 was prepared in the same manner as in Example 2 except that 120 parts of the carboxylated terpenephenol resin and 10 parts of naphthoic acid were used. A color-developing sheet was produced in the same manner as in Example 1 and tested for its quality and performance. The test results were shown in Table 1.

EXAMPLE 5

100 parts of the carboxylated terpenephenol resin of Example 2 (using limonene and carbolic acid) and 45 parts of benzoic acid were charged into a glass vessel, heated at 140°–150° C. (in oil bath) to obtain a melted product. 8.5 parts of ammonium bicarbonate and 4.7 parts of zinc oxide were gradually added to the melted product. After cooling, a light-brown plate Compound No. 5 was obtained. A color-developing sheet was produced in the same manner as in Example 1, and tested for its quality and performance. The test results were shown in Table 1.

EXAMPLE 6

120 parts of the carboxylated terpenephenol resin of Example 2 (using limonene and carbolic acid) and 3 parts of solicylic acid were admixed and then treated with zinc salt in the same manner as in Example 2. In this manner, Compound No. 6 was obtained. A color-developing sheet was produced in the same manner as in Example 1, using Compound No. 6 as a color-developing agent.

EXAMPLE 7

70 parts of the carboxylated terpenephenol resin of Example 1 (using α-pinen and carbolic acid) and 80 parts of cresotic acid were treated with zinc salt in the same manner as in Example 5. Thus, Compound No. 7 was obtained. A color-developing sheet was produced in the same manner as in Example 1, and tested for its quality and performance. The test results were shown in Table 1.

COMPARATIVE EXAMPLE 1

400 parts of the carboxylated terpenephenol resin of Example 1 (using α-pinene and carbolic acid), 48 parts of sodium hydroxide were dissolved in 2000 ml methanol. The resultant solution was heated to 50° C. 400 ml of methanol which contains 28.0 parts of zinc chloride were added dropwise thereto. The reaction was carried out at 50° C. for one hour, then the solvent was removed. Then, a light-yellow zinc salt of carboxylated terpenephenol resin was obtained (this is named as Compound 8).

A color-developing sheet was produced in the same manner as in Example 1, using Compound No. 8 as a color-developing agent, and tested for its quality and performance. The test results were shown in Table 1. As seen clearly in Table 1, the novel combined polyvalent metal salts of this invention are better in color-developing rate, color-developing intensity and light fastness than the polyvalent metal salt of carboxylated terpenephenol resin in Comperative Example.

Effects of this invention

As explained above, a reaction product of a carboxylated terpenephenol resin, an aromatic carboxylic acid and polyvalent metal compound provides a superior color-developing rate and an improved light fastness under maintaining both a stability to light, gases and the like and a stabity to chemicals, wherein the polyvalent metal salts of carboxylated terpenephenol resin is inferior in a color-developing rate and light fastness.

Further, the reaction product of this invention can be produced easily from inexpensive raw material. Therefore, the color-developing agent of this invention is that for a pressure-sensitive recording sheet which is superior in the production, color-developing ability and preservability before and after the use and is useful in industry.

TABLE 1

Test Results of Color-developing Sheet

| | Aromatic carboxlic acid (B) and its ratio in combination with carboxylated terpenephenol resin (A) | | | | | Color-developing properties (%) | | | |
|---|---|---|---|---|---|---|---|---|---|
| | Aromatic carboxylic acid (B) | (B) Weight % | (B) Aquivalent % | Polyvalent metal | Transfer sheet | Color developing rate $J_1$ | Color developing intensity $J_2$ | Lightfastes (%) $(J_3/J_2) \times 100\%$ | Water suspension of color-developing agent |
| Example 1 | Benzoic acid | 16.7 | 28.6 | Zinc | A (Blue) | 43.7 | 55.5 | 53.0 | Very good |
| | | | | | B (Black) | 40.5 | 53.8 | 92.6 | |
| Example 2 | Salicylic acid | 9.7 | 14.7 | Zinc | A | 44.0 | 55.1 | 51.5 | Very good |
| | | | | | B | 39.5 | 52.2 | 91.8 | |
| Example 3 | 3,5-Di-tert-butylsalicylic acid | 31.0 | 32.7 | Zinc | A | 45.0 | 57.3 | 58.2 | Very good |
| | | | | | B | 42.2 | 53.9 | 94.9 | |
| Example 4 | Naphthoic acid | 7.7 | 9.6 | Zinc | A | 42.0 | 54.6 | 48.3 | Very good |
| | | | | | B | 39.7 | 52.1 | 91.0 | |
| Example 5 | Benzoic | 31.0 | 45.0 | Zinc | A | 44.8 | 56.0 | 55.4 | Good |
| | | | | | B | 41.9 | 53.8 | 93.5 | |
| Example 6 | Sulicylic acid | 2.4 | 3.8 | Zinc | A | 40.3 | 54.0 | 45.0 | Very good |
| | | | | | B | 38.3 | 51.2 | 90.1 | |
| Example 7 | Cresotic acid | 53.3 | 64.6 | Zinc | A | 41.8 | 52.5 | 33.3 | Moderate |
| | | | | | B | 38.8 | 50.8 | 88.8 | |
| Comparative Example | — | 0 | 0 | Zinc | A | 39.9 | 52.7 | 42.5 | Very good |
| | | | | | B | 37.2 | 50.0 | 87.7 | |

We claim:

1. A color-developing agent for pressure-sensitive recording sheet which comprises a reaction product of carboxylated terpenephenol resin, aromatic carboxylic acid and polyvalent metal compound.

2. The color-developing agent according to claim 1, wherein said aromatic carboxylic acid is used an amount of 5–50 molar % equivalent, based on said carboxylated terpenephenol resin.

3. The color-developing agent according to claim 1, wherein said aromatic carboxylic acid is aromatic monocarboxylic acid.

4. The color-developing agent according to claim 1, wherein said polyvalent metal compound is at least one substance selected from the group consisting of oxides, halides, carbonates, sulfates, nitrates, acetates, formates, oxalates, benzoates, acethylacetonates and salicylates of magnesium, aluminium, cadmium, calcium, titanium, zinc, nickel, cobalt, manganese and vanadium.

5. The color-developing agent according to claim 1, wherein said polyvalent metal is at least one member selected from the group consisting of magnesium, aluminum and zinc.

6. The color-developing agent according to claim 1, wherein said polyvalent metal is zinc.

* * * * *

UNITED STATES PATENT AND TRADEMARK OFFICE
CERTIFICATE OF CORRECTION

PATENT NO. : 4,784,692

DATED : Nov. 15, 1988

INVENTOR(S) : Hiroaki Umeda; Mamoru Suzuki; Akira Hasegawa; Kunio Hata

It is certified that error appears in the above-identified patent and that said Letters Patent is hereby corrected as shown below:

In Column 1, line 53, before "both" enter --for--; and line 56, change "are" to --it is--.

Column 2, line 10, change "monoterpen" to --monoterpene--;

line 12, change "terpentine" to --turpentine--;

line 20, change "toluen" to --toluene--;

lines 34 and 36, change "terpenphenol" to --terpenephenol--; and line 58, change "dicaroxylic" to --dicarboxylic--.

Column 3, line 25, change "hydroxid" to --hydroxide--.

Column 4, line 14, change "preferred" to --prepared--;

line 55, change "diethylamino 7" to --diethylamino-7--;

line 56, change "7 anilinofluoran" to --7-anilinofluoran--; and line 63, change "methylchormene" to --methylchromene--.

Column 8, line 55, change "ocresol" to --o-cresol--.

UNITED STATES PATENT AND TRADEMARK OFFICE

CERTIFICATE OF CORRECTION

PATENT NO. : 4,784,692

DATED : Nov. 15, 1988

INVENTOR(S) : Hiroaki Umeda; Mamoru Suzuki; Akira Hasegawa; Kunio Hata

It is certified that error appears in the above-identified patent and that said Letters Patent is hereby corrected as shown below:

In Column 9, in Table 1, line 4, change "Lightfastes" to --Lightfastness--;

line 5, change "Aqui-" to --Equi---; and line 13, after "Benzoic" add --acid--.

Column 10, line 63, change "an" to --in--.

Column 11, line 5, change "acethylacetonates" to --acetylacetonates--.

Signed and Sealed this

Twelfth Day of September, 1989

*Attest:*

DONALD J. QUIGG

*Attesting Officer*

*Commissioner of Patents and Trademarks*